United States Patent [19]

LaCombe

[11] Patent Number: 4,932,583
[45] Date of Patent: Jun. 12, 1990

[54] METHOD AND APPARATUS FOR NON-METALLURGICAL ATTACHMENT OF DISSIMILAR METALS

[76] Inventor: Paul B. LaCombe, P.O. Box 33205, San Antonio, Tex. 78233

[21] Appl. No.: 419,453

[22] Filed: Oct. 10, 1989

[51] Int. Cl.$^5$ .............................................. B23K 33/00
[52] U.S. Cl. .................................. 228/138; 228/140; 228/49.1
[58] Field of Search ............... 228/138, 139, 140, 174, 228/49.1; 29/469.5

[56] References Cited

U.S. PATENT DOCUMENTS

| | | |
|---|---|---|
| 1,045,459 | 11/1912 | Todd et al. . |
| 3,495,321 | 2/1970 | Shaff et al. .......................... 228/174 |
| 3,537,411 | 11/1970 | Roy . |
| 4,265,166 | 5/1981 | Parker et al. . |
| 4,519,303 | 5/1985 | Snook . |
| 4,624,405 | 11/1986 | Newell ................................ 228/49.1 |
| 4,625,437 | 12/1986 | Curtis et al. ........................ 228/138 |
| 4,715,524 | 12/1987 | Fukaya et al. ...................... 228/174 |

FOREIGN PATENT DOCUMENTS 199688  11/1983  Japan .................................. 228/138

Primary Examiner—M. Jordan
Attorney, Agent, or Firm—Cox & Smith Incorporated

[57] ABSTRACT

A method and an apparatus which non-metallurgically attaches two dissimilar metals and, in particular, but not by way of limitation, a method and an apparatus for non-metallurgically attaching corrosion resistant metals to non-corrosion resistant metals.

4 Claims, 2 Drawing Sheets

METHOD AND APPARATUS FOR NON-METALLURGICAL ATTACHMENT OF DISSIMILAR METALS

BACKGROUND OF THE INVENTION

This invention relates to non-metallurgical attachment of dissimilar metals, and in particular, but not by way of limitation, to a method and an apparatus for non-metallurgically attaching corrosion resistant metals to non-corrosion resistant metals.

Heavy industries, such as utility power generation companies, other solid fossil fuel burning plants, chemical processing plants, etc., release corrosive gases through FGD (flue-gas desulfurization) systems composed of ducts and ductworks such as scrubbers and precipitators prior to ultimate release through stacks. Such ducts, duct-works and stacks are commonly made of non-corrosion resistant metals such as carbon steel. Through heavy use by passage of flue-gases, the metals that comprise these substrate ducts and stacks are constantly corroded through chemical reactions and eroded through physical passage of flue-gases, resulting in fissures, cracks, and dangerous cavities. Thus, some form of protection is required if such ducts and stacks are to last a cost-effective period.

Furthermore, the heavy industries mentioned above and others have recently been restricted in their release of nitrous oxides ($NO_x$) and sulfuric acids ($SO_2$) by regulatory agencies. For instance, the E.P.A. has issued stringent restrictions on the amounts of $NO_x$ and $SO_2$ that any given plant can release into the atmosphere. These regulations require these industries to modify existing pollution control techniques to comply with current federal standards. Conduit and stack systems have a design-to-construction lag time of about ten years. Because it takes approximately ten years from the conception of a system to actual commercial on-line application, systems designed before the onset of recent emission restrictions fail to comply with the new regulations.

As a result, older plants have had to use additives to reduce the release of $NO_x$ and $SO_2$ because ad hoc structural design changes in existing systems is impractical if not impossible. However, the earlier design systems of these older plants did not necessarily factor into consideration the use of additives which reduce emission of $NO_x$ and $SO_2$. The current use of these additives by older plants can compound corrosion problems, making the need for an improved corrosion resistant lining even more necessary.

In the past, various linings have been used to retard this constant wear and tear of substrate metal by corrosion with refractory lining materials or paint-like coatings. One such refractory lining used is Gunite which helps resist corrosion when applied in approximately two-inch thick coats to non-corrosion resistant metals such as carbon steel. However, such linings prove uneconomical because they do not last and have to be constantly replaced. Not only are these materials expensive, costly manpower is needed to replace and maintain the linings. Furthermore, these coatings are inadequate in ensuring protection because the coatings themselves are not immune to corrosion. They merely act as sacrificial linings to slow the degradation process down.

Corrosion resistant metal linings are a practical improvement over these application difficulties. Metal alloys such as hastelloys (high grade nickel alloys) and metals such as titanium are resistant to both corrosion and erosion. They can be permanently clad onto the inner surfaces of ductwork and stacks and can last throughout the lifetime of the non-corrosion resistant metal substrate that comprise these conduits.

Hastelloys are usually cost-prohibitive because of wide fluctuations in their price which is dependant on swings in the geopolitical climate. Nickel is produced in countries whose political policies are not notably stable and long-term cost planning and projections of supply are impractical. Titanium is the corrosion resistant metal of choice because of the stability of its geopolitical availability and the relative stability of its price. Furthermore, titanium is one-half the weight of hastelloys, and since the application technology involves manual installation of the sheets of metal, the lighter weight provides a relatively easier installation.

However, regardless of availability, costs, and effective corrosion resistance of either alloys or pure metal, the real problem encountered by the relevant industry is the difficulty in the method of affixing corrosion resistant metals, such as titanium, to corrosion susceptible substrate surfaces to form a complete protective seal.

Corrosion resistant metals have to completely cover the surface area of non-corrosion resistant metals; otherwise, destruction will persist through cracks and minute openings in the FGD systems where corrosive materials and moisture condensate can creep into. Ideally, corrosion resistant metal sheets need to be welded directly onto the non-corrosion resistant metal substrate forming tight bonds so that a complete, leakproof seal is formed. However, metallurgically, metals of dissimilar types such as titanium and carbon steel cannot be welded together.

There is a need for a method of attaching such dissimilar metals without metallurgical attachment, while still maintaining the ability to cover and completely seal off the total surface area of metal substrates susceptible to corrosion.

An industrial group called Pfaudler has disclosed a method of attaching titanium to carbon steel in a publication called *Resista-Clad Physical & Chemical Performance Data, Pfaudler Data Sheet DS*49-303-1, copyright Sohio Chemicals 1985. Basically, the method involves a brazing technique utilizing an electrode wheel. A carbon steel edge is fused to a sheet of titanium using silver solder by applying electrode heat and physical pressure using the electrode wheel. The Data Sheet claims the process to be "resistance welding"; however, it is well-known to those skilled in the art that it is impossible to metallurgically attach carbon steel to titanium.

Application by the relevant industry using the Pfaudler method has seen failures such as delamination due to the brittleness of the resulting brazing attachment. The brazing technique is inconsistent in its binding strength. When applied within ductwork, the attachments between carbon steel and titanium using the Pfaudler method form hairline cracks or simply delaminate and fall apart. Thus, this process is practically no improvement over prior methods of simple coating with refractory materials.

Thus, there is a need in the relevant industry for an improved method and apparatus which can effectively clad a corrosion resistant metal such as titanium to a dissimilar metal substrate with sufficient strength and sealing ability to allow protection against erosion and corrosion. There is a need for a more cost-effective lining to increase the productivity of FGD systems to protect against the damages caused by flue-gases, which is compounded by additives that have to be used by plants whose original designs fail E.P.A. requirements for reduction of $NO_x$ and $SO_2$ emissions.

The present invention is an improved and cost-effective method of permanently cladding corrosion resistant metals such as titanium to non-resistant metal substrates such as carbon steel without metallurgical welding of the two dissimilar metals using an apparatus called PERMA CLAD. Thus, the PERMA CLAD system of the present invention is an improved method and apparatus that addresses the above-mentioned needs. These improvements and other novel advances will become apparent to those skilled in the art by the following disclosure of the invention.

SUMMARY OF THE INVENTION

The basic underlying concept behind the present invention is a system of overlapping sheets. Whereas past methods of protecting non-corrosion resistant metal surfaces can be viewed as "paint coating," the present invention can be conceptualized as "wallpapering." Sheets of corrosion resistant metal are welded together in an overlapping manner called lap joints over non-resistant metal surfaces, thereby providing a complete seal against leakage of corrosive materials into the underlying non-resistant metal substrate.

The overlapping method of welding is necessary because metals such as titanium cannot be welded to the underlying dissimilar substrate metal such as carbon steel. Various metals can comprise the underlying non-corrosion resistant metals such as carbon steel, stainless steel, and other ferrous alloys; and various types of corrosion resistant metals can form the overlapping protective cover sheets such as titanium, zirconium, niobium and tantalum. For purposes of this disclosure, and not by way of limitation, carbon steel will be used as an example of a non-corrosion resistant metal substrate, while titanium will exemplify a corrosion resistant metal.

Metals of like kind, such as carbon steel, can be welded to the carbon steel substrate that comprise the conduits of FGD systems in the relevant industrial plants. Likewise, titanium sheets that overlap each other and form the cladded protective lining can be metallurgically attached to each other. However, as previously mentioned, the titanium cladding cannot be metallurgically attached to carbon steel. Without an effective method of attaching carbon steel to the titanium lining, which can withstand shear forces existing within FGD systems, the lining has no integrity because it cannot be held in place. The present invention discloses the means by which this high tensile strength attachment is effectively accomplished without metallurgical attachment between carbon steel and titanium.

Initially, strips of prefabricated carbon steel are affixed to prefabricated sheets of titanium along desired edges of the titanium sheet using the PERMA CLAD method of the present invention. Carbon steel edges, affixed to titanium sheets, are then welded to the carbon steel substrate surface that comprises the ducts, ductwork, stacks and other conduits in the relevant plants. This process is repeated until the entire surface of the substrate metal to be protected is completely covered.

Following the metallurgical attachment of all carbon steel edges to the underlying substrate metal surface, the sheets of titanium, PERMA CLAD to carbon steel edges, are welded to the next adjacent sheets of titanium, also PERMA CLAD to carbon steel edges, in an overlapping fashion. This process of overlapping forms a complete seal of titanium over the entire surface of the underlying carbon steel. Thus, the titanium sheets are mechanically bound to and "permanently clad" over the underlying substrate metal.

Metallurgical attachments occur only between metals of like kind (carbon steel edges to carbon steel substrate and titanium to overlapping titanium), while the actual attachment of dissimilar metals (titanium sheets and carbon steel edges) is accomplished by the mechanical bond provided by the PERMA CLAD system of the present invention.

Additionally, a weld-washer system composed of a titanium cover cap and a carbon steel weld washer is installed into the overall titanium cladding at predetermined spacings to provide firmer support against flexing. Slots are punched through the titanium cladding at predetermined spacings and the carbon steel washer is fillet-welded directly onto the underlying carbon steel substrate surface. The cover cap of titanium is then welded onto the overlying titanium cladding sheets, thus forming a complete seal around the washer.

This weld-washer system can also be utilized for emergency repairs anywhere on the system. For instance, while the cladding structure is being manually installed, a carbon steel strip edge could be dropped and dented. The dented edge could be sheared off and a new carbon edge can be attached by blowing or drilling a hole through the relevant titanium sheet. The weld-washer system can, thus, also be used as a means of repair as well as a hold-down means.

The PERMA CLAD method of attachment, the PERMA CLAD apparatus, the weld-washer system and other objects, features and advantages of this invention will become evident to those skilled in the art in light of the following description of the invention.

BRIEF DESCRIPTION OF THE DRAWINGS

FIG. 4 depicts a cross-sectional side view, shown from lines 4—4 in FIG. 1, depicting the PERMA CLAD system in assembled form. Corrosion resistant metal sheet 15 is shown extending from the PERMA CLAD attachment system 5 to overlapping corrosion resistant metal lap-joint portion 25 and seal weld 38. FIG. 4 also depicts weld-washer system 18 which is placed at predetermined spacings along the entire cladding system.

DETAILED DESCRIPTION OF THE PREFERRED EMBODIMENT

As stated above, the present invention discloses a method and means to non-metallurgically attach two dissimilar metals. For purposes of this detailed description of the preferred embodiment, and not by way of limitation, carbon steel will be used as an example of a non-corrosion resistant metal substrate, while titanium will exemplify a dissimilar corrosion resistant metal.

Figure 1:
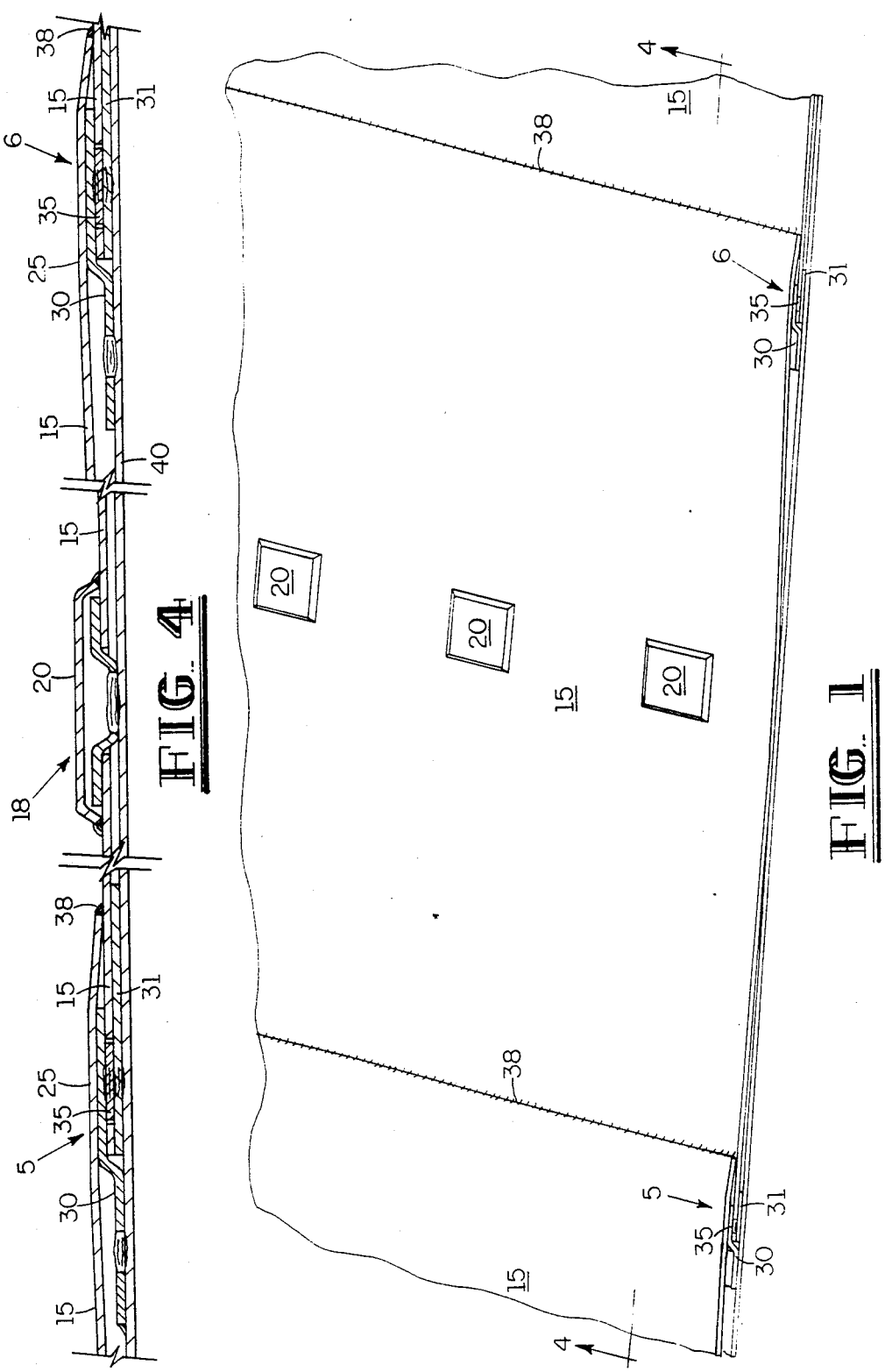
FIG. 1 is a perspective view of the PERMA CLAD system in complete assembled form depicting both the PERMA CLAD attachments and the overlapping titanium welded seals.

Referring to FIG. 1, the PERMA CLAD system 5 is shown in fully assembled form depicting the non-metallurgical attachment of carbon steel backing strip 30 and a lower, intermediate sheet of carbon steel 31 to titanium sheet 15 in a sandwich fashion. The titanium sheet 15 extends in a planar manner beyond PERMA CLAD system 5 to the next adjacent PERMA CLAD system 6 where it overlaps and is subsequently metallurgically attached at seal weld 38 to the titanium portion of PERMA CLAD system 6. FIG. 1 further depicts a top perspective view of a plurality of titanium cover caps 20 which cover underlying weld-washer systems 18.

FIG. 4 depicts a cross-sectional side view shown from lines 4—4 in FIG. 1. Weld-washer system 18 is placed at a predetermined position on the permanent cladding. The spacing of the plurality of washer systems 18 is predetermined according to the needs of a specific project, and the number of systems needed will be determined by the specific engineering requirements of a particular job site. The purpose of weld-washer system 18 is to provide additional means of holding down the titanium cladding directly onto the underlying metal substrate at points not attached by the PERMA CLAD systems. This reduces possible flexing by the overall cladding and their positioning is, again, pre-engineered according to the needs of a particular project.

FIG. 4 further depicts a side view of PERMA CLAD system 5, showing the sandwiching of titanium sheet 15 between carbon steel backing strip 30 and intermediate carbon steel sheet 31. Titanium sheet 15 is shown extending to and overlapping onto the next adjacent PERMA CLAD system 6 to a lap-joint portion 25 which is metallurgically attached to the titanium of the adjacent PERMA CLAD system 6 at seal weld 38. This system of overlapping and seal welding provides for the complete cladding of the underlying substrate metal.

Ultimately, when the overlapping seal welds are completed over the entire surface area to be cladded, the only remaining exposed metal is titanium. To ensure a 100% seal, conventional dye testing is performed to verify that no crevices exist where corrosive materials or moisture could possibly penetrate.

Figure 2:
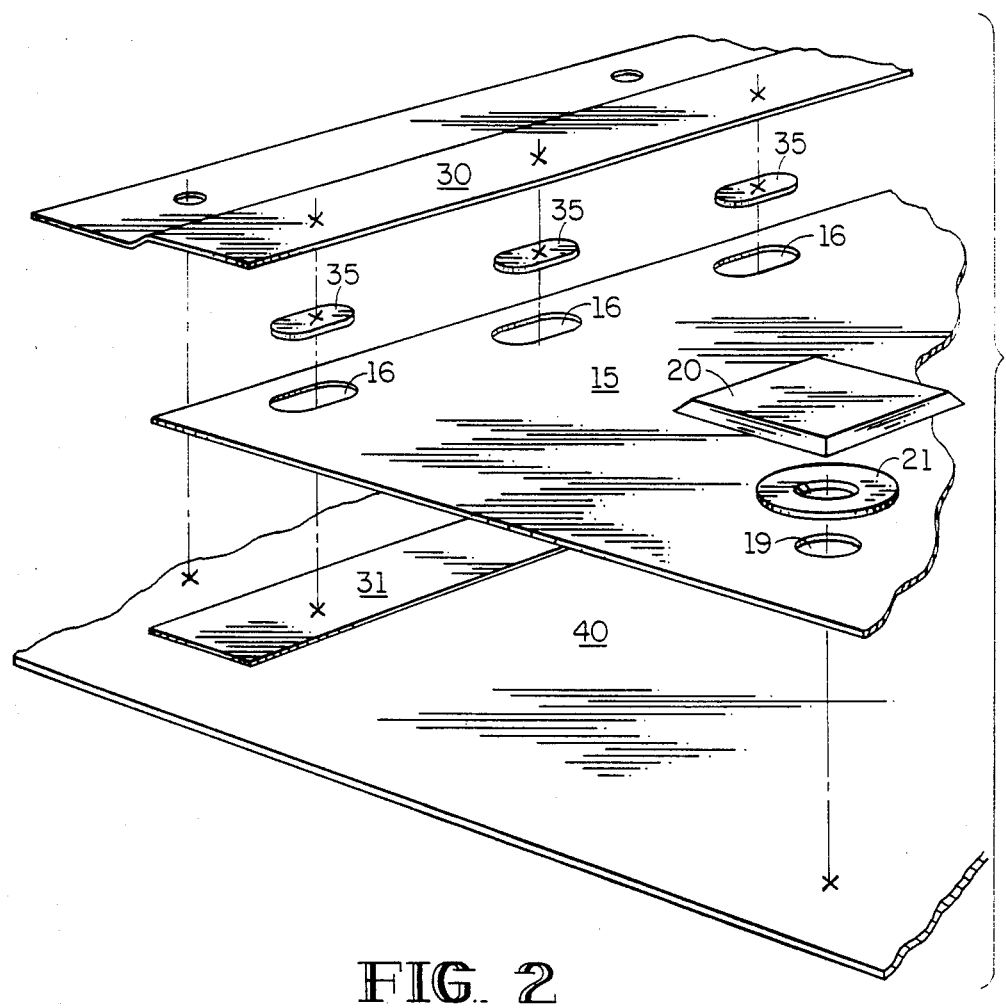
FIG. 2 depicts an exploded perspective view of the PERMA CLAD system showing its different components, a backing strip of corrosion susceptible metal 30, a plurality of corrosion susceptible metal plugs 35, a corrosion resistant metal sheet 15 with a plurality of prefabricated slots 16 at an edge of sheet 15, a lower, intermediate sheet of corrosion susceptible metal 31, and a portion of the substrate corrosion susceptible metal 40. Also depicted is an exploded perspective view of a weld-washer system showing its components, a cover cap composed of a corrosion resistant metal 20 and a weld washer 21 composed of a corrosion susceptible metal.

FIG. 2 depicts an exploded perspective view of the PERMA CLAD system showing the different components that comprise the system. Prefabricated titanium sheet 15 is manufactured with a plurality of slot bordering edges 16 at predetermined centers with pre-engineered shapes and sizes of slots dependent on the needs of a particular project. The slot bordering edges 16 are designed and manufactured to specifications which make the slots 16 slightly oversized in relation to the carbon steel plugs 35. Accordingly, carbon steel plugs 35 are manufactured to specifications which make them slightly undersized in relation to the slots 16 of titanium sheet 15 into which they are to be incorporated.

The PERMA CLAD system begins with a means of indexing wherein carbon steel backing strip 30, carbon steel plugs 35, titanium sheet 15 and intermediate carbon steel sheet 31 are aligned such that carbon steel plugs 35 are indexed at pre-engineered points. When these layers and components are sandwiched together, the carbon steel plugs 35 are perfectly recessed and centered into slot bordering edges 16 on titanium sheet 15.

Spot welding means, well-known in the art, are placed at indexed points both above and below the sandwiched components. The backing strip 30, the plugs 35, and the intermediate strip 31 are spot welded by shooting charges of electricity through the three elements, thereby forming a weld nugget which fuses the three carbon steel components.

The spot welding is accomplished at pre-engineered nugget sizes wherein the diameters of the resulting nugget are predetermined. Furthermore, the indentation of the spot weld is also predetermined wherein the thickness of the indentation from the backing strip 30 to lower sheet 31 is also pre-engineered. Such pre-engineered, strict quality controlled welding is well-known by those skilled in the relevant art.

FIG. 2 further depicts an exploded perspective view of the weld-washer system showing its components, titanium cover cap 20 and carbon steel weld washer 21. Well washer 21 is manufactured to include a conical shoulder which is pre-engineered at a length from the base of the washer to the lip to correspond to the thickness of titanium sheet 15. Titanium sheet 15 further includes a punched slot 19 through which said conical shoulder of washer 21 passes and the lip of washer 21 ultimately rests on the surface of substrate carbon steel 40.

Figure 3:
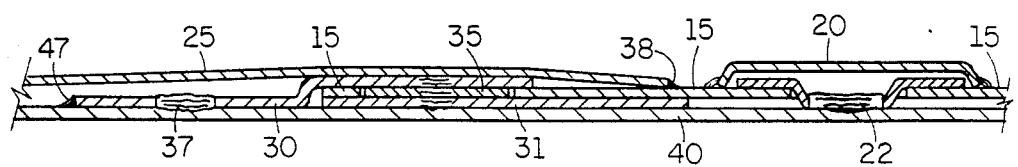
FIG. 3 depicts a cross section of the PERMA CLAD system after a first metallurgical attachment of backing strip 30, plug 35, and intermediate sheet 31. Plug weld 37 and fillet weld 47 depict a second series of metallurgical attachments between backing strip 30 and substrate metal 40. Also depicted is an overlapping corrosion resistant metal portion at lap-joint 25 which is metallurgically attached to adjacent corrosion resistant metal sheet 15 at seal weld 38. Additionally, FIG. 3 also depicts a cross section of the weld-washer system showing titanium cap cover 20 metallurgically attached to corrosion resistant metal sheet 15 and weld washer 21 metallurgically attached to substrate 40 at fillet weld 22.

FIG. 3 depicts a cross section of the weld-washer system. Carbon steel weld washer 21 is metallurgically attached to carbon steel substrate 40 at fillet weld 22. Titanium cap cover 20 is then overlayed to cover the entire exposed surface area of the upper planar portion of weld washer 21 and fillet weld 22. The edges of titanium cover cap 20 are then metallurgically attached to titanium sheet 15 to form a complete seal.

FIG. 3 further depicts a cross section of the PERMA CLAD system. Titanium sheet 15 is shown sandwiched between carbon steel backing strip 30 and intermediate carbon steel sheet 31. The metallurgical attachment of backing strip 30, plug 35, and intermediate sheet 31 forms a mechanical bond which holds titanium sheet 15 firmly in place. Thus, there is no metallurgical attachment between titanium sheet 15 to any carbon steel element. The PERMA CLAD system physically holds down titanium sheet 15 to the carbon steel elements.

Following the creation of the PERMA CLAD mechanical bond, a portion of carbon steel backing strip 30 is metallurgically attached to substrate metal 40 at spot weld 37 and fillet weld 47. Thus, these metallurgical attachments between carbon steel backing strip 30 to carbon steel substrate 40 are the basic welds which metallurgically bind the PERMA CLAD system to the underlying substrate to be protected. All exposed carbon steel is next covered by titanium through overlapping titanium metal lap-joint portion 25 which is metallurgically attached to titanium metal sheet 15 at seal weld 38. A minimum one-inch overlap is made to ensure adequate coverage of the underlying carbon steel. In this manner, all exposed substrate metal and any exposed corrosion susceptible materials are completely covered in an overlapping manner by titanium.

As mentioned earlier, the underlying substrate need not be carbon steel. Any corrosion susceptible metal can be protected using the preferred embodiment of the present invention. Additionally, titanium is not the exclusive corrosion resistant cladding that can be utilized. This invention discloses a method and apparatus whereby a metal, which is corrosion resistant and dissimilar to another metal which is corrosion susceptible, can be non-metallurgically bound to said dissimilar corrosion susceptible metal, thereby allowing the creation of a protective lining.

Thus, the present invention is well-suited to carry out the objects and attain the ends and advantages mentioned above as well as those inherent therein. While the preferred embodiments of the present invention have been described for the purposes of this disclosure, changes in the design and arrangements of features can be made by those skilled in the art, which changes are encompassed within the spirit of this invention as defined by the appended claims.

What is claimed is:

1. A method of non-metallurgically attaching two dissimilar metals, which comprises:
    slotting a plurality of bordering edges at predetermined centers and in predetermined sizes on a planar sheet of corrosion resistant metal;
    placing a planar sheet of corrosion susceptible metal over said planar sheet of corrosion resistant metal;
    indexing a plurality of corrosion susceptible metal plugs such that said plugs are aligned with said plurality of bordering edges on said planar sheet of corrosion resistant metal;
    placing a prefabricated corrosion susceptible metal backing strip under said plurality of corrosion susceptible metal plugs indexed to said plurality of bordering edges on said planar sheet of corrosion resistant metal;
    metallurgically attaching said planar sheet of corrosion susceptible metal to said plurality of corrosion susceptible metal plugs; and
    metallurgically attaching said plurality of corrosion susceptible metal plugs to said prefabricated corrosion susceptible metal backing strip such that a mechanical, non-metallurgical attachment is created between said planar sheet of corrosion resistant metal and the corrosion susceptible metal elements.

2. The method of claim 1 wherein said corrosion susceptible metal plugs are pre-engineered to be undersized in relation to said slot bordering edges on said planar sheet of corrosion resistant metal.

3. The method of claim 1 wherein said metallurgical attachment converts said corrosion susceptible metal plugs into pre-engineered nugget sizes wherein the diameters of the resulting nuggets are predetermined and the indentation of said metallurgical attachment is predetermined wherein the thickness of the indentation from said corrosion susceptible metal backing strip to said planar sheet of corrosion susceptible metal is pre-engineered.

4. An apparatus which binds two dissimilar metals together without metallurgical attachment between the two dissimilar metals, comprising:
    a planar sheet of a metal of a first kind at an uppermost portion;
    a planar sheet of a metal of a second kind dissimilar to said metal of said first kind in an intermediate position under said planar sheet of a metal of a first kind;
    said planar sheet of a metal of a second kind having a plurality of slotted bordering edges;
    a plurality of plugs of a metal of said first kind indexed and recessed within said plurality of slotted bordering edges; and
    a prefabricated backing strip of a metal of said first kind at the lowermost portion such that said planar sheet of a metal of a first kind, said plurality of plugs of a metal of the first kind, and said prefabricated backing strip of a metal of the first kind are metallurgically attached so that said planar sheet of a metal of a second kind dissimilar to said metal of said first kind is mechanically held in place.

* * * * *